(12) United States Patent
Dugger

(10) Patent No.: US 10,036,151 B1
(45) Date of Patent: Jul. 31, 2018

(54) DRAIN ENGAGEABLE BOWL

(71) Applicant: Kevin Dugger, Carlsbad, CA (US)

(72) Inventor: Kevin Dugger, Carlsbad, CA (US)

( * ) Notice: Subject to any disclaimer, the term of this patent is extended or adjusted under 35 U.S.C. 154(b) by 0 days.

(21) Appl. No.: 15/601,956

(22) Filed: May 22, 2017

(51) Int. Cl.
  *E03C 1/14* (2006.01)
  *E03C 1/23* (2006.01)

(52) U.S. Cl.
  CPC .............. *E03C 1/14* (2013.01); *E03C 1/2308* (2013.01)

(58) Field of Classification Search
  CPC ............ A47J 47/20; A47J 43/24; E03C 1/262
  USPC ....................................... 4/286–295
  See application file for complete search history.

(56) References Cited

U.S. PATENT DOCUMENTS

| | | | | |
|---|---|---|---|---|
| 862,570 A * | 8/1907 | MacDonald | ............. | A47J 47/20 4/290 |
| 2,246,390 A * | 6/1941 | Smith | ..................... | E03C 1/262 137/368 |
| 3,289,218 A * | 12/1966 | Mehilos | ................... | A47J 47/20 141/333 |
| 3,377,634 A * | 4/1968 | Patterson | ................. | A47L 19/04 4/290 |
| 4,205,710 A * | 6/1980 | Dunicz | ..................... | E03C 1/26 141/286 |
| 4,336,620 A * | 6/1982 | Gresh | ..................... | E03C 1/186 4/286 |
| 6,088,844 A * | 7/2000 | Killham | .................. | E03C 1/262 4/287 |
| 6,135,307 A * | 10/2000 | Fahy | ...................... | A47G 19/02 220/521 |
| 7,467,718 B1 * | 12/2008 | Donohue | ................ | A47J 43/24 210/464 |
| 2002/0078497 A1 * | 6/2002 | Perucchi | ................. | A47J 43/24 4/642 |
| 2008/0230462 A1 * | 9/2008 | Curtin | ..................... | A47J 43/22 210/232 |
| 2011/0272336 A1 * | 11/2011 | Tuosto | .................... | A47J 47/20 210/163 |
| 2014/0291236 A1 * | 10/2014 | Thomas | ................ | A47J 19/005 210/482 |
| 2016/0136696 A1 * | 5/2016 | Christopherson | ......... | B08B 3/02 134/198 |

* cited by examiner

*Primary Examiner* — Janie Loeppke
(74) *Attorney, Agent, or Firm* — Donn K Harms

(57) ABSTRACT

A drain engageable bowl having an interior cavity with an opening at a bottom end thereof. The opening aligns with an axial passage running though an annular projection connected to the bowl and aligned with the opening. The annular projection is adapted to frictionally engage with an interior of a sink drain, and hold the bowl elevated above the lower surface of a sink surrounding the drain. Sealable openings in the sidewall of the annular projection provide an actuable drain for fluid from the sink keeping it separated from the interior cavity of the bowl.

8 Claims, 6 Drawing Sheets

DRAIN ENGAGEABLE BOWL

BACKGROUND OF THE INVENTION

1. Field of the Invention

The present invention relates generally to bowls such as those used for food preparation and serving. More particularly, the invention relates to a drain-engageable bowl adapted for removable engagement with a sink drain or garbage disposal inlet, to maintain a separation from the contents within a sink surrounding the bowl and the contents of the bowl.

2. Prior Art

Food preparation both in commercial restaurants, as well as in the home, constantly employs bowls for mixing of various food recipes and the like. During food preparation for many dishes, a cutting and/or cleaning of a particular ingredient in the recipe is often required. Such is the case, for example, when preparing a mixed salad which includes multiple greens and other ingredients or, for example, fruit salad, where multiple types of fruit are cleaned, cut, and prepared for addition to the fruit salad.

During preparation of foods where processing of the ingredients may be required, the individual processed components of the recipe being prepared must be kept separate from the uncut, uncleaned, and unprocessed components. For example, during preparation of a salad or other ingredients which are fresh and grown, each individual ingredient generally must be cut and cleaned, and subsequently washed with water prior to addition to the mixed food being prepared.

Frequently, such preparation is done over a sink having a drain leading to an underlying garbage disposal. Various food components of a recipe may be cut and cleaned over the sink, with the undesirable parts removed therefrom, being washed into the garbage disposal through the drain. The cleaned recipe foods or vegetables or fruits are positioned on a counter or the like as the process is ongoing. However, positioning the cleaned items on a counter or the like is time consuming and likely to cause a need for additional cleaning should these items come in contact with the sink surface.

Additionally, in some recipes there is a need to cool a particular food item of a recipe prior to mixing or serving it. Conventionally for cold prepared items, this may require a mixing and concurrent cooling of the food to be served where a user employs one bowl for mixing positioned in another having water or ice therein. In cases where foods are heated and must be cooled, generally the pan holding the heated food is removed from heat, and then let set in the pot or container on a sink surface for a duration of time. In some cases, a pan used for heating the food may be located within a sink and then surrounded by cold water, or even ice, to help cool the contents of the pan.

However, whether using a sink for cleaning food and then separating the clean food from the remnants, or cooling food prior to addition to a recipe, or cooling an item during preparation, it can be most inconvenient when using a sink for such functions. Frequently, the clean food can become mixed with that to be cleaned in the sink, and more frequently, the underlying drain can become unusable due to food or remnants being positioned within the sink and blocking access to a drain plug or the like.

The device herein provides structure yielding function and utility to provide separated sections in a sink for food preparation, where both are independently employable with a closed or open drain to thereby allow for fluid drainage from either of the separated cavities, independent of the other. The device herein is adapted for removable engagement with a drain in a sink or especially an underlying garbage disposal, to allow the user to prepare and separate foods, fruits, and vegetables and the like, and constantly drain water or fluid to the drain below the device, through one or a pair of drain pathways.

The forgoing examples of related art, as to food preparation and the like within sinks, and the limitations related therewith, are intended to be illustrative and not exclusive, and they do not imply any limitations on the invention described and claimed herein. Various other limitations in the related art for drain engageable bowls will become apparent to those skilled in the art upon a reading and understanding of the specification below and the accompanying drawings.

SUMMARY OF THE INVENTION

As disclosed herein, the device is configured as a drain engageable bowl shaped component having an outlet for fluid run through the bowl to the sink drain which is separated from a drain passage formed to drain the surrounding sink. The bowl portion of the body, defining the device, has an interior cavity communicating to the underlying sink drain or garbage disposal inlet through the provision of an axial passage running through an annular projection. The exterior of this annular projection is adapted to sealably engage within a drain aperture of a sink either frictionally or using a provided projecting seal.

Defining the inlet for a passage provided to drain fluid from the surrounding sink is one or a plurality of openings communicating through the wall forming the annular projection of the device. An actuable closure may be engaged to cover the openings and thereby allow for either normal or slowing or blocking of fluid, which may drain through the openings.

In some modes of the device, a secondary conduit may be provided which is positioned axially within the exterior projecting portion. This forms both a first fluid pathway through the one or plurality of openings, and a second fluid pathway from the bowl running through an axial passage in the secondary conduit.

The device may also include a one way or check valve positioned in the axial passage communicating from the bowl portion to the underlying drain, to prevent fluid from communicating into the interior cavity of the bowl. Further, the device may be configured to also include a flexible engagement of the bowl with the annular projection, allowing the bowl to tilt when the annular projection is engaged with a sink drain.

With respect to the above description, before explaining at least one preferred embodiment of the herein disclosed invention in detail, it is to be understood that the sink engageable container device herein is not limited in its application to the details of construction and to the arrangement of the components in the following description or illustrated in the drawings. The invention herein described is capable of other embodiments and of being practiced and carried out in various ways which will be obvious to those skilled in the art upon a reading of this specification. Also, it is to be understood that the phraseology and terminology employed herein are for the purpose of description and should not be regarded as limiting.

As such, those skilled in the art will appreciate that the conception upon which this disclosure is based may readily be utilized as a basis for designing of other structures, methods and systems for carrying out the several purposes of the present disclosed drain engageable bowl or container. It is important, therefore, that the claims be regarded as including such equivalent construction and methodology insofar as they do not depart from the spirit and scope of the present invention.

The objects features, and advantages of the present invention, as well as the advantages thereof over existing prior art, which will become apparent from the description to follow, are accomplished by the improvements described in the following detailed description, which fully discloses current best modes of the invention, but should not be considered as placing limitations thereon.

BRIEF DESCRIPTION OF DRAWING FIGURES

The accompanying drawings, which are incorporated herein and form a part of the specification, illustrate some, but not the only or exclusive examples of embodiments and/or features. It is intended that the embodiments and figures herein are to be considered illustrative of the drain-engageable bowl herein, rather than limiting.

Figure 1:
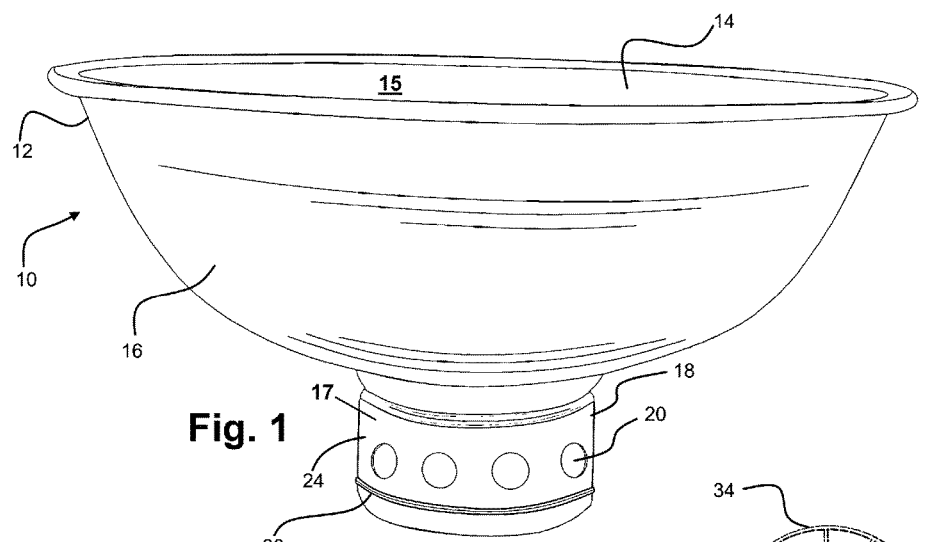
FIG. 1 depicts a side view of the drain engageable device herein showing a bowl portion having an interior cavity therein which communicates through an axial passage running through an annular projection adapted to engage within a drain aperture of a sink either frictionally as in other depictions or with a projecting seal shown in FIG. 1.

Other aspects of the present drain engageable bowl invention shall be more readily understood when considered in conjunction with the accompanying drawings, and the following detailed description, neither of which should be considered limiting.

DETAILED DESCRIPTION OF THE PREFERRED EMBODIMENTS OF THE INVENTION

In this description, the directional prepositions of up, upwardly, down, downwardly, front, back, top, upper, bottom, lower, left, right and other such terms refer to the device as it is oriented and appears in the drawings and are used for convenience only; they are not intended to be limiting or to imply that the device has to be used or positioned in any particular orientation.

Now referring to drawings in FIGS. 1-11, wherein similar components are identified by like reference numerals, there can be seen in FIG. 1 an overhead side view of the drain engageable device 10 herein. As depicted in all modes in the various drawings, the device 10 has a body having a portion formed as a bowl 12. The bowl 12 has a formed interior cavity 14 defined by an interior surface 15 of a sidewall 16 which extends a height to an upper edge 13 opposite a lower end of the formed bowl 12.

Also common to all modes of the device 10 herein, an annular wall 17 defines an annular projection 18 which extends from a first end connected with a lower centrally located portion of the sidewall 16 to a distal end. This connection at the first end is a sealed engagement of the annular projection in position on said sidewall which aligns an axial passage 22 running through the annular projection 18 with a bowl opening 32 at a lower end of the interior cavity 14.

At least one or preferably a plurality of openings 20 communicate through the annular wall 17 forming the annular projection 18 at positions adjacent the engagement of the first end thereof with the sidewall 16. The openings 20 provide a path or communication through the annular wall 17 and with the axial passage 22 shown in FIG. 2 running axially through the annular projection 18. As noted with the first end of the annular projection 18 in a sealed engagement with the sidewall 16, this passage 22 also aligns with and communicates with the bowl opening 32 which is in a centrally located portion of the interior cavity 14 at the lower end of the bowl 12.

An exterior surface 24 of the annular projection 18 defines a circumference thereof. This circumference at the distal end opposite the first end engaged with the bowl 12 is adapted to frictionally engage within a drain opening 26 in a sink bottom 28 such as that of FIG. 6. In particular, the exterior circumference at the distal end of the annular projection 18 is adapted to engage a drain opening 26 leading to a garbage disposal.

The engagement of the exterior circumference of the annular projection 18 can be frictional, as noted. Additionally, while only shown in FIG. 1, a projecting compressible seal 30 may be positioned on, and extend from the exterior surface 24 of the annular projection 18 and engage within the drain opening 26 as an additional seal to prevent fluid passage between the drain opening 26 and the annular projection 18 when removably engaged therein.

Figure 2:
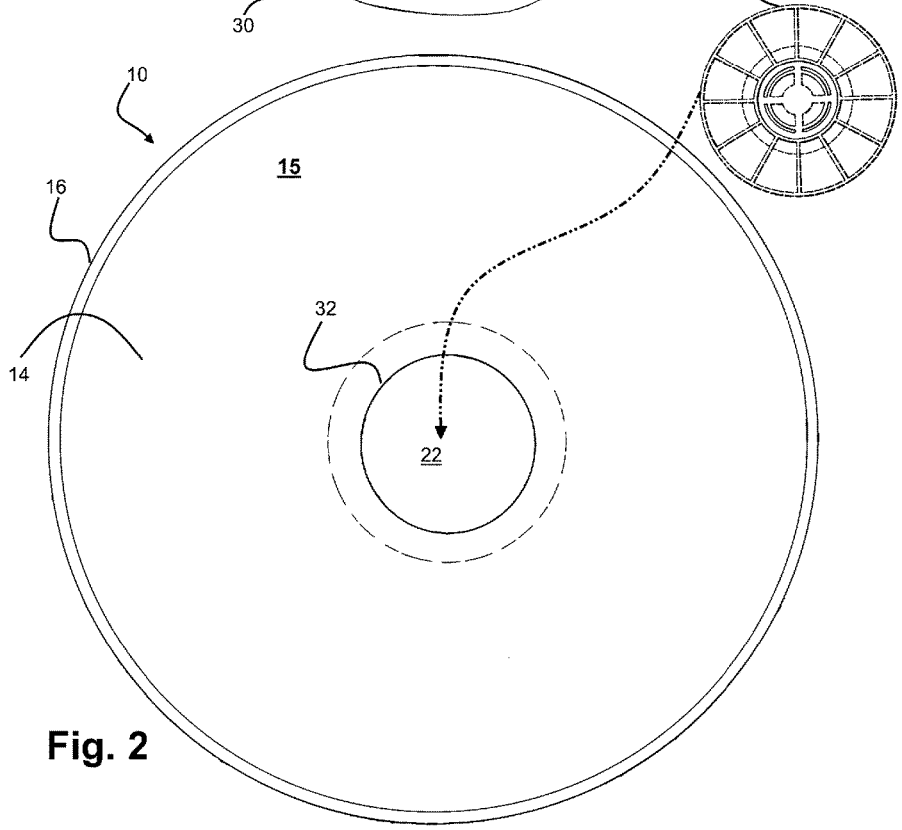
FIG. 2 is a top plan view of the device as shown in FIG. 1 showing the interior cavity formed within the annular curved sidewall of the device and showing the axial passage communicating with a bowl opening in the central area of the interior cavity at its lowest point and an optional engagement of a strainer therein.

FIG. 2 is a top plan view of the device 10 of FIG. 1 and typical to all modes shown in the drawings herein. As can be discerned from the various figures, the interior cavity 14 defined by the interior surface of the curved sidewall 16 of the device 10 slopes toward central portion thereof, which communicates with the bowl opening 32. As noted the axial passage 22 from the annular projection 18 is connected to this bowl opening 32 and allows fluid or solid drainage therethrough.

Figure 6:
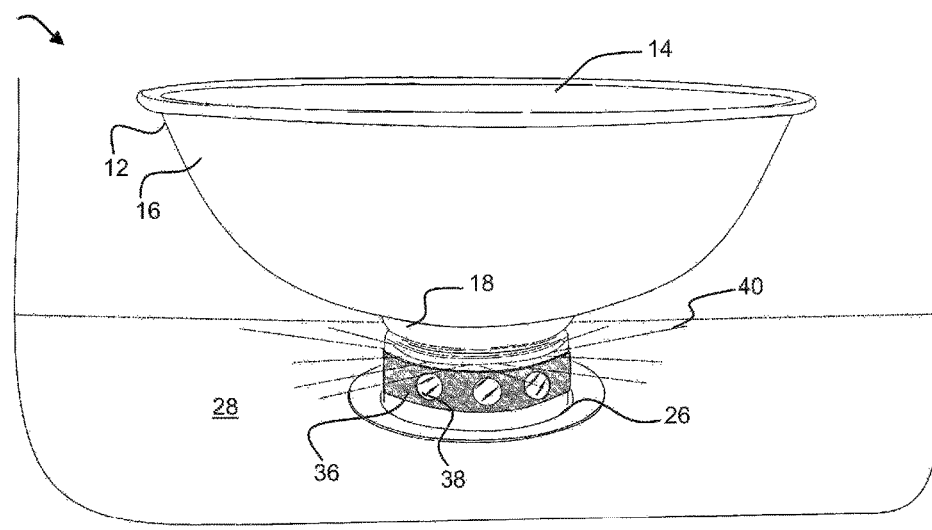
FIG. 6 shows the device as configured in FIG. 5, preventing drainage of water of fluid within a sink cavity surrounding the device.

Preferably, the bowl opening 32 has a diameter sized for engagement to the sink strainer 34 which is normally positioned within the drain opening 26 shown in FIG. 6. Such allows the sink strainer 34 to engage within the drain opening 26 and allow passage of fluid into the axial passage 22 during use. A plug may also be engaged in the bowl opening 32 if drainage is not desirable.

Figure 3:
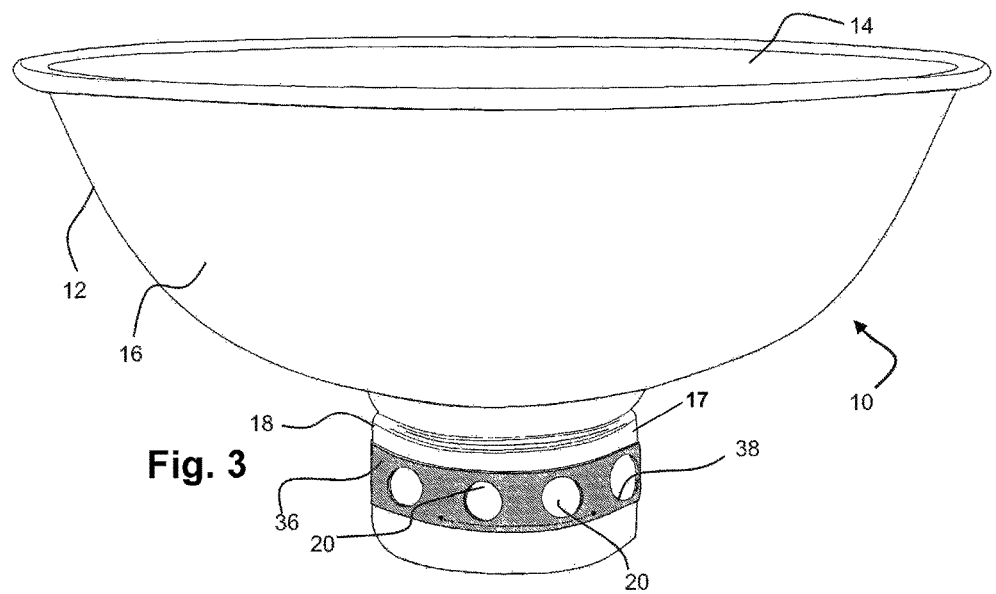
FIG. 3 shows the device as in FIG. 1, also including a closure for the opening or openings communicating through the wall forming the annular projection of the device, which allows for slowing or blocking of fluid passage therethrough.
Figure 4:
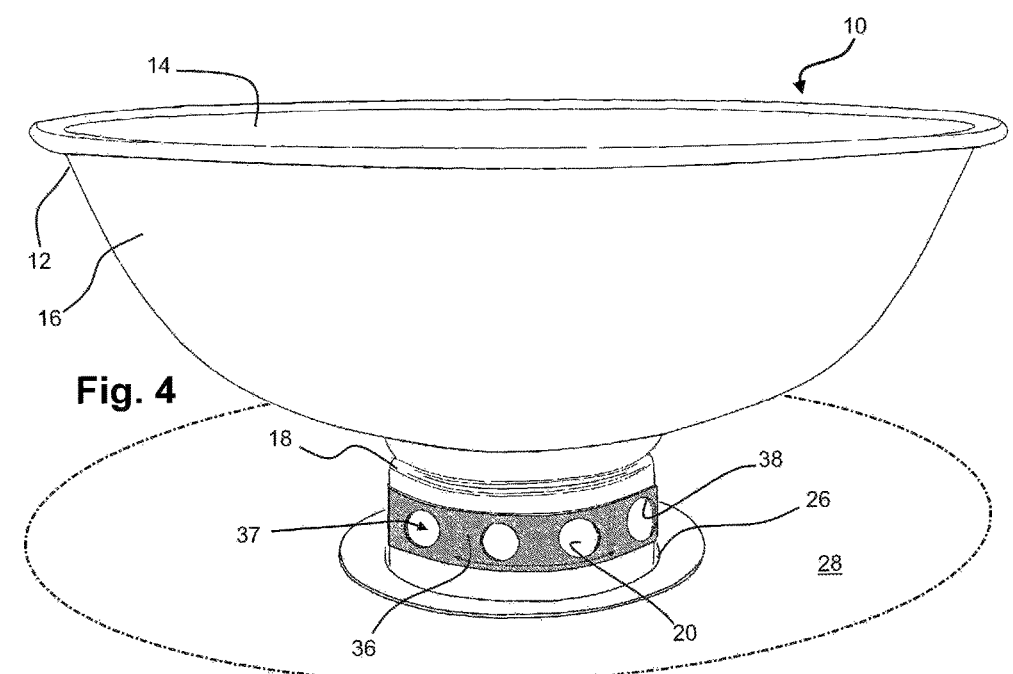
FIG. 4 shows the device herein in a typical engagement of the exterior surface of the annular projecting portion, with the interior circumference defining a drain within a sink bottom.

Shown in FIGS. 3 and 4, the device 10 has a body configured substantially the same as FIG. 1, but includes a closure 36 which is actuable to seal the one or plurality of openings 20, and thereby prevent fluid passage from the sink, into the drain opening 26, when the annular projection 18 of the device is engaged therein.

Currently, a closure 36 is shown having one or a plurality of closure openings 38 in positions spaced to correspond with the openings 20 in the annular projection 18. The closure 36 is sized to rotate on the exterior surface of the annular projection 18 and can be rotated to an open position shown in FIGS. 3-4 which allows for a first fluid pathway 37 to communicate through the one or plurality of openings 20. The closure 36 is also positionable to a closed position shown in FIGS. 5-6. In the closed position, the closure openings 38 are misaligned with the openings 20. In this closed position portions of the body of the closure 36 between the closure openings 38, block the openings 20 and prevent fluid flow therethrough.

Figure 5:
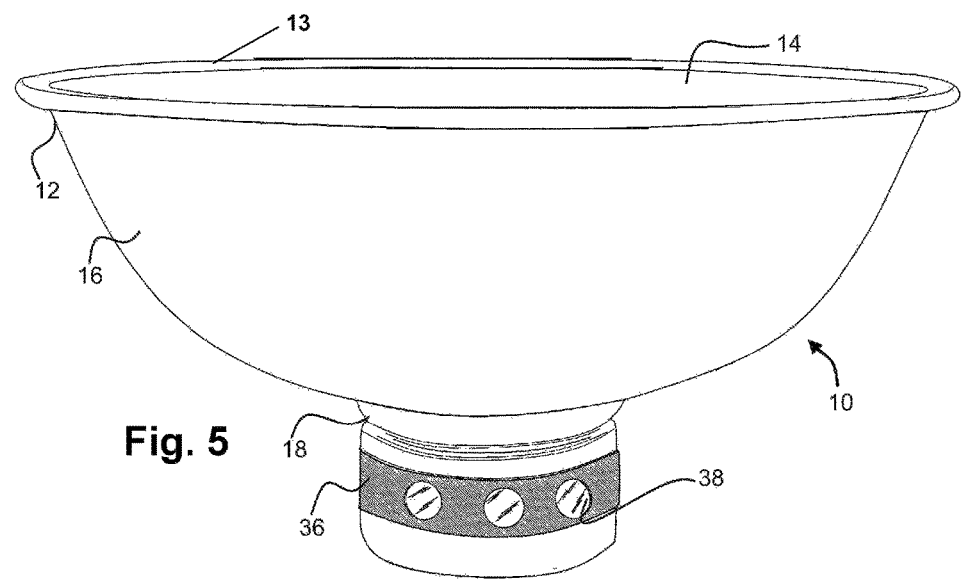
FIG. 5 shows the device as in FIG. 3, wherein the annular rotating closure has been rotated to block the one or plurality of openings formed through the wall of the annular projection.

FIG. 5 as noted shows the device 10 with the closure 36 rotated to the closed position blocking the first fluid pathway 37 shown in FIG. 4. When the device is engaged to an as-used position shown in FIG. 6, with the annular projection 18 removably engaged within the interior surface of the drain opening 26, fluid within the sink will not drain and can rise in a contact with the exterior surface of the sidewall 16. This is especially helpful should cooling or heating of the contents within the interior cavity 14 be desired since cold water or ice, or hot water, can be positioned within the sink to contact the sidewall 16.

Figure 7:
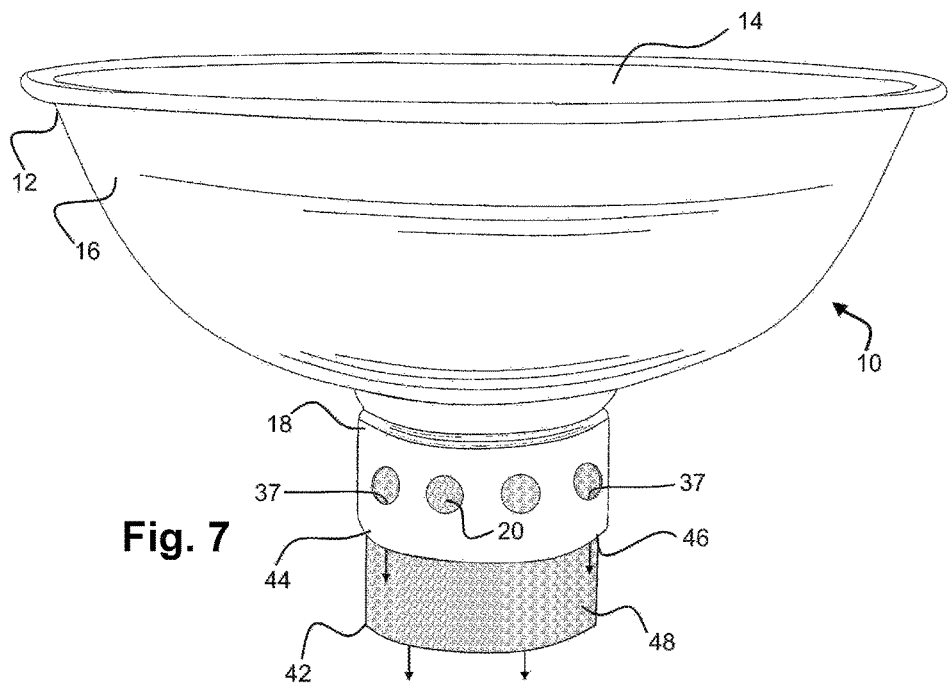
FIG. 7 shows the device as in FIGS. 1-6, having a secondary conduit, positioned within the exterior projecting portion, and showing a first fluid pathway through the one or plurality of openings, and a second fluid pathway from the bowl, running through an axial passage in the secondary conduit.

Shown in FIG. 7 is a mode of the device 10 as shown in the other figures, which includes a secondary conduit 42 extending from the bowl opening 32 shown in FIG. 2, a length to a distal end. The length of the wall forming the secondary conduit 42 is such that it extends a distance past the distal end 44 of the annular projection 18. In this mode the axial passage 22 leading from the interior cavity 14 runs through this secondary conduit 42 and exits below the distal end 44 of the annular projections 18.

Figure 8:
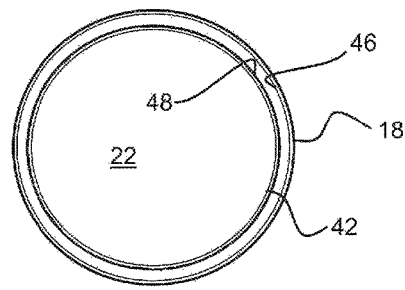
FIG. 8 depicts a bottom view of the drain opening of the device of FIG. 7, showing the axial passage running through the secondary conduit into the bowl interior cavity and showing a secondary fluid pathway running between an exterior surface of the secondary conduit and the interior surface of the annular projection.

Also shown in this mode of the device in bottom view of FIG. 8 as well as FIG. 7, the first fluid pathway 26 runs in-between an inner surface 46 of the annular projection 18 and an outer surface 48 of the secondary conduit 42. While depicted without the closure 20 shown in 3-6, the closure 20 may of course be included on the device 10 as shown in FIG. 7.

Figure 9:
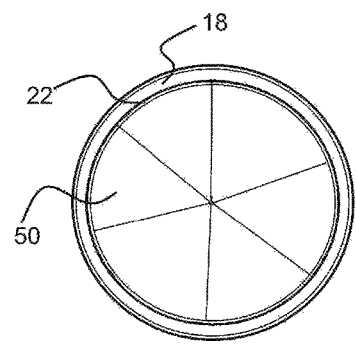
FIG. 9 shows a mode of the device herein having a one way or check valve positioned in the axial passage to prevent fluid from communicating into the interior cavity of the bowl.

In FIG. 9 is depicted an optional check valve 50 which is positioned within the axial passage 22 such as the ProfFlow available from the Ferguson Company or the JV6820 Check valve from Johnson Valves of the UK, or a similar flap type check valve which allows fluid and large solids to exit. This check valve 50, however, prevents back-flow of fluid into the interior cavity 14 through the axial passage 22 but allows fluid to exit the interior cavity 14 and into the drain opening. Such a check valve 50 may be employed with any of the depicted modes of the device 10 herein.

Figure 10:
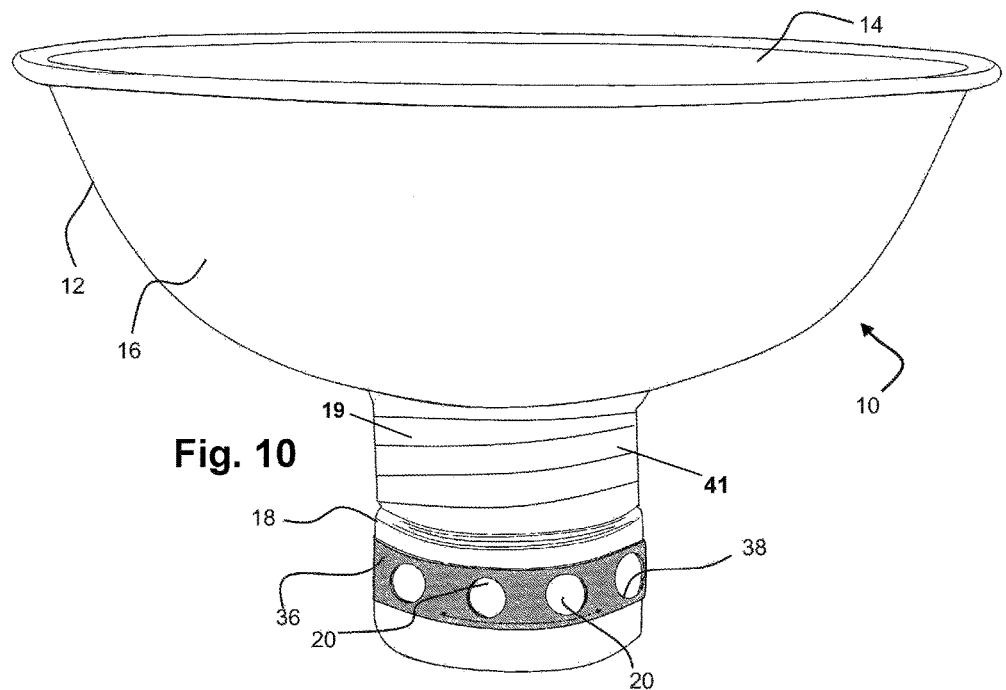
FIGS. 10-11 show a mode of the device which includes a flexible engagement of the bowl to or formed as part of the annular projection, allowing the bowl to tilt when the annular projection is engaged with a sink drain.
Figure 11:
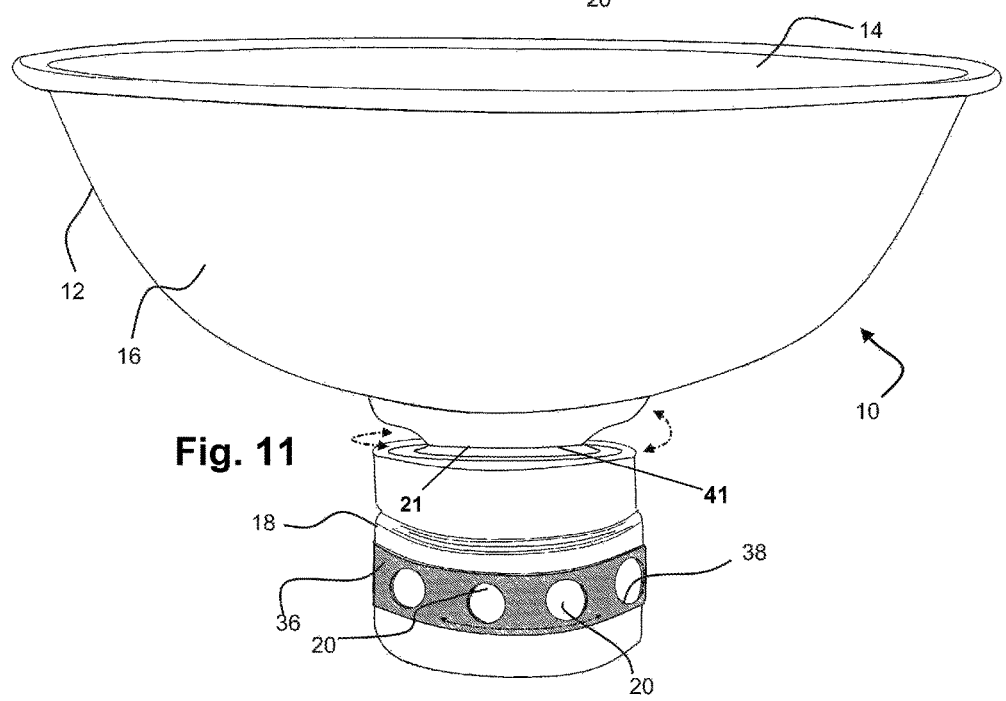

FIGS. 10-11 show a mode of the device 10 which includes a flexible connection 41 of the bowl 12 with the annular projection 18. This flexible connection 41 can be formed as part of the annular projection 18 at a first end thereof, or can be engaged between the first end of the annular projection 18 and the opening at the bottom of the bowl 12. In FIG. 10 the flexible connection 41 is formed of a flexible conduit 19 portion allowing tilting of the bowl 12 relative to the axis of the annular projection 18. In FIG. 11 the flexible connection 41 is formed of a ball portion formed on the bottom of the bowl 12 which rotationally engaged with a socket connection at the first end of the annular projection 18 in a sealed engagement. This ball and socket 21 flexible connection 41 provides a means for both a tilting of the bowl 12 as well as a rotation of the bowl 12 in its engagement with the first end of the annular projection 18.

Figure 12:
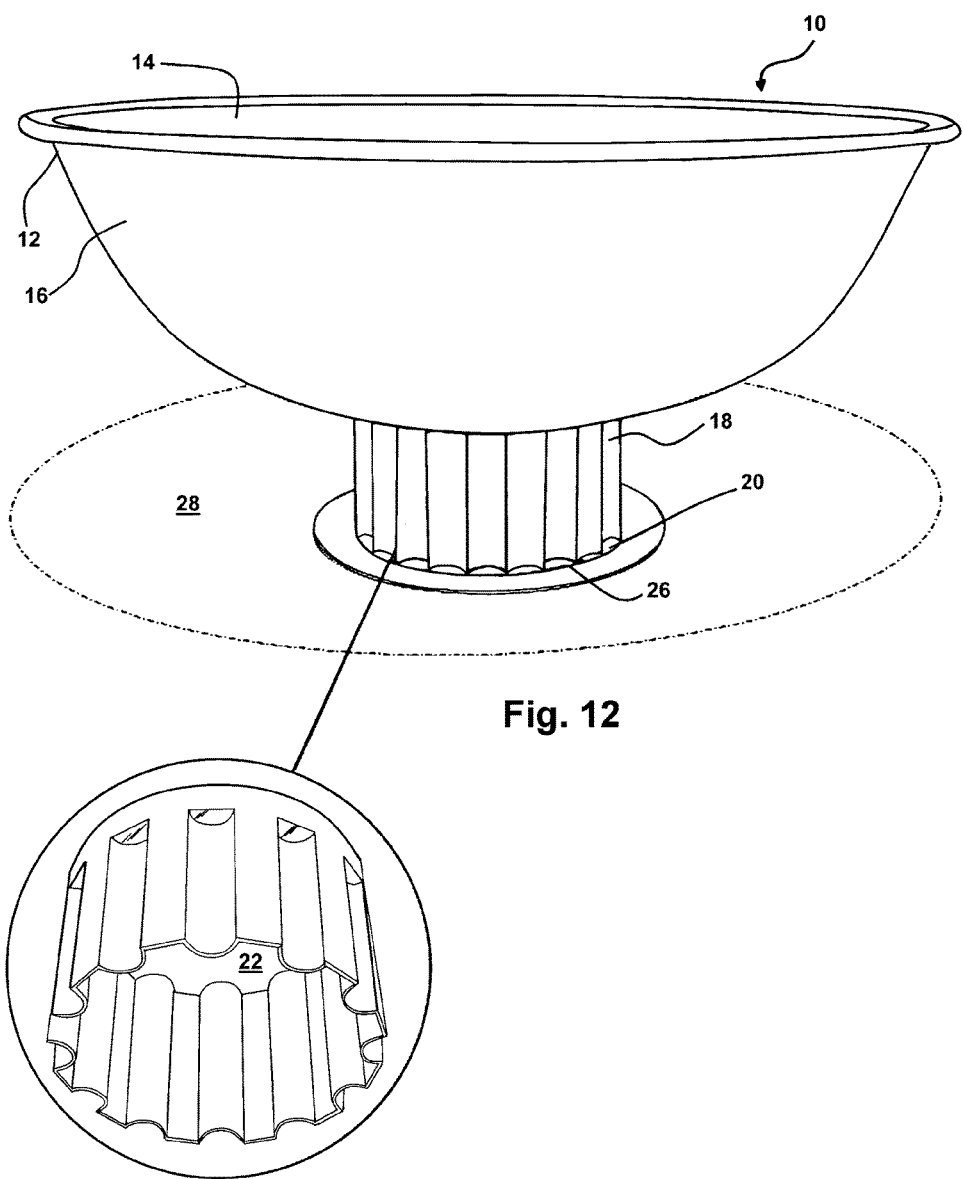
FIG. 12 depicts a perspective of the drain engageable device of FIG. 1, and showing a bowl portion having an interior cavity therein which communicates through an axial passage running through a radially corrugated annular projection having a circumference adapted to engage within a drain aperture of a sink and concurrently forming openings for fluid passage in between angled portions thereof.

Finally, FIG. 12 depicts a perspective of the drain engageable device 10 much as in FIG. 1. In this mode of the device 10, the axial passage 22 runs through the annular projection 18 which is formed by angled portions of the annular projection 18. A circumference of the annular projection 18 is sized to frictionally engage within a drain aperture 26 of a sink 28 and concurrently form the openings 20 for fluid passage in between angled portions of the annular projection 18. This mode of the device allows for slight compression of the annular projection 18 and flexure of the angled portions forming it to adapt to the circumference of different sized drain openings 26.

While all of the fundamental characteristics and features of the mount and drain engageable bowl invention herein have been shown and described herein, with reference to particular embodiments thereof, a latitude of modification, various changes and substitutions are intended in the foregoing disclosure and it will be apparent that in some instances, some features of the invention may be employed without a corresponding use of other features without departing from the scope of the invention as set forth. It should also be understood that various substitutions, modifications, and variations may be made by those skilled in the art, without departing from the spirit or scope of the invention. Consequently, all such modifications and variations and substitutions are included within the scope of the invention as defined by the following claims.

What is claimed is:

1. A drain engageable bowl apparatus, comprising:
    a bowl, said bowl having a sidewall having an interior surface and exterior surface;

an interior cavity of said bowl defined by said interior surface of said sidewall, said interior cavity extending to an upper edge of said sidewall from a lower end of said interior cavity;

a bowl opening communicating through said sidewall at a centrally located portion of said interior cavity at said lower end thereof;

an annular projection having a first end and a distal end and having an axial passage running therethrough within an annular sidewall;

said first end of said annular projection in a sealed connection to said sidewall of said bowl, in a position aligning said axial passage with said bowl opening;

a plurality of said openings communicating through said annular sidewall at a position in-between said distal end and said first end of said annular projection;

an exterior circumference area of said annular projection at adapted in size for a frictional engagement within a sink drain;

a closure formed by a ring rotationally engaged upon said exterior circumference of said annular projection, said closure having a plurality of closure openings communicating therethrough;

said closure rotatable between said first position sealing said plurality of said openings through said sidewall to said second position wherein said closure openings align with said opening in said annular sidewall;

a secondary conduit having a wall extending from a first end thereof to a second end, said wall of said secondary conduit having an interior surface defining a passage therethrough, and having an exterior surface;

said secondary conduit running coaxially within said annular projection;

said passage of said secondary conduit in a sealed engagement with said bowl opening and forming a first fluid passage from said interior cavity through said opening and through said passage, to said drain;

a gap between said exterior surface of said secondary conduit and an interior surface of said annular conduit; and said gap defining a second fluid passage between said openings in said annular sidewall and said drain;

whereby said exterior circumference area of said annular projection can be frictionally engaged with said drain opening, and actuation of said closure to said second position forms a passage for liquid to drain from said sink surrounding said drain.

2. The drain engageable bowl apparatus of claim 1, wherein said exterior circumference area of said annular projection is a compressible seal extending circumferentially around an exterior surface area of said annular sidewall.

3. The drain engageable bowl apparatus of claim 1 additionally comprising:
a length of said secondary conduit extending from said first end thereof to said second end being longer than a length of a length of said annular projection between said first end thereof to said distal end thereof.

4. The drain engageable bowl apparatus of claim 2 additionally comprising:
a length of said secondary conduit extending from said first end thereof to said second end being longer than a length of a length of said annular projection between said first end thereof to said distal end thereof.

5. The drain engageable bowl apparatus of claim 1 additionally comprising:
said sealed connection of said first end of said annular projection with said sidewall of said bowl being flexible, whereby said bowl is tiltable upon said first end of said annular projection.

6. The drain engageable bowl apparatus of claim 2 additionally comprising:
said sealed connection of said first end of said annular projection with said sidewall of said bowl being flexible, whereby said bowl is tiltable upon said first end of said annular projection.

7. The drain engageable bowl apparatus of claim 1 additionally comprising:
said sealed connection of said first end of said annular projection with said sidewall of said bowl being a ball portion of said sidewall of said bowl surrounding said opening engaged with a socket at said first end of said annular projection; and
said bowl being tiltable and rotatable upon said first end of said annular projection.

8. The drain engageable bowl apparatus of claim 2 additionally comprising:
said sealed connection of said first end of said annular projection with said sidewall of said bowl being a ball portion of said sidewall of said bowl surrounding said opening engaged with a socket at said first end of said annular projection; and
said bowl being tiltable and rotatable upon said first end of said annular projection.

* * * * *